US012653740B2

(12) United States Patent
Younger

(10) Patent No.: US 12,653,740 B2
(45) Date of Patent: Jun. 16, 2026

(54) TRANSFER BENCH

(71) Applicant: Medical Depot, Inc., Port Washington, NY (US)

(72) Inventor: Max Jefferies Younger, Roeland Park, KS (US)

(73) Assignee: Medical Depot, Inc., Port Washington, NY (US)

( * ) Notice: Subject to any disclaimer, the term of this patent is extended or adjusted under 35 U.S.C. 154(b) by 88 days.

(21) Appl. No.: 18/903,295

(22) Filed: Oct. 1, 2024

(65) Prior Publication Data

US 2026/0090935 A1 Apr. 2, 2026

(51) Int. Cl.
*A61G 7/10* (2006.01)
*A47K 3/12* (2006.01)

(52) U.S. Cl.
CPC ............ *A61G 7/1003* (2013.01); *A47K 3/122* (2013.01); *A61G 7/1025* (2013.01); *A61G 7/1059* (2013.01)

(58) Field of Classification Search
CPC .. A61G 7/1003; A61G 7/1025; A61G 7/1059; A47K 3/122
See application file for complete search history.

(56) References Cited

U.S. PATENT DOCUMENTS

| | | | | | |
|---|---|---|---|---|---|
| 4,091,479 | A * | 5/1978 | Hancock | A61G 7/1034 | 4/560.1 |
| 4,359,791 | A | 11/1982 | Thomas | | |
| 5,903,935 | A * | 5/1999 | Huelke | A47K 3/122 | 4/578.1 |
| 6,226,810 | B1 * | 5/2001 | Weddendorf | A47K 3/122 | 4/578.1 |
| 7,451,501 | B2 | 11/2008 | Cheng | | |
| 7,661,154 | B2 | 2/2010 | Cheng | | |
| 7,690,055 | B2 | 4/2010 | Hammer et al. | | |
| 9,468,573 | B2 | 10/2016 | Edwards et al. | | |
| 10,722,033 | B1 * | 7/2020 | Chen | A47C 3/18 | |
| 11,633,069 | B2 | 4/2023 | Chao | | |
| 2011/0289677 | A1 * | 12/2011 | Huang | A61G 7/1034 | 5/81.1 R |
| 2013/0205491 | A1 * | 8/2013 | Edwards | A61G 7/1019 | 4/560.1 |
| 2021/0378897 | A1 * | 12/2021 | Veloz | A47K 3/122 | |

OTHER PUBLICATIONS

International Search Report and Written Opinion dated Oct. 16, 2025, issued in corresponding international application No. pct/US2025/036589, 10 pages.

* cited by examiner

*Primary Examiner* — Christine J Skubinna
(74) *Attorney, Agent, or Firm* — Bradley J. Shelowitz

(57) ABSTRACT

A bathing or showering transfer bench includes a single beam supporting first and second side pedestals, and a carriage slidably supported on the single beam. A seat is rotationally supported on the carriage and configured to slide with the carriage along the single beam between the first and second side pedestals.

20 Claims, 6 Drawing Sheets

TRANSFER BENCH

FIELD

The present disclosure relates to transfer benches, and more particularly, to transfer benches for facilitating transfer of the mobility-impaired into and out of showers and/or baths.

BACKGROUND

A shower/bath transfer bench assists users, such as elderly and otherwise disabled persons, in getting into and out of a tub by sitting and sliding over the bathtub's side to get into the bathing area. Typically, a transfer bench has a first outer portion positioned outside of the tub, an intermediate portion that extends over a ledge of the tub, and a second outer portion positioned inside of the tub. Some transfer benches require the user to shimmy themselves along the surface of the transfer bench to enter and exit the tub while others are equipped with a seat that slides along a track of the transfer bench. The seat of some transfer benches may be rotatably supported on the transfer bench to allow a user to rotate their body position to assist with exiting and entering a tub.

There is a continuing need for improving the functionality, foldability, stability, and/or convenience of use of transfer benches.

SUMMARY

In accordance with an aspect of the present disclosure, a transfer bench for aiding a user in transitioning into and out of a bathing area is provided and includes a first side pedestal configured to be positioned outside of a bathing area, a second side pedestal configured to be positioned inside of the bathing area, a single beam coupling the first and second side pedestals to one another, and a seating assembly slidably supported on the single beam. The seating assembly includes a carriage and a seat supported on the carriage. The carriage defines an enclosed channel therethrough, and the single beam extends through the enclosed channel of the carriage. The single beam is configured to slidingly support the carriage thereon. The seat is configured to slide with the carriage along and relative to the single beam.

In aspects, the single beam may include a first end and an opposite second end. The first side pedestal may be coupled to the first end of the single beam, and the second side pedestal may be coupled to the second end of the single beam.

In aspects, the carriage may be configured to slide relative to and along the single beam between the first and second ends thereof.

In aspects, the first side pedestal may include a first pair of legs coupled to one another, and the second side pedestal may include a second pair of legs coupled to one another. Each of the first pair of legs may have a vertical portion, and a horizontal portion configured to extend into the first end of the single beam. Each of the second pair of legs may have a vertical portion, and a horizontal portion configured to extend into the second end of the single beam.

In aspects, the horizontal portion of the first pair of legs and the horizontal portion of the second pair of legs may be separated from one another along a longitudinal axis of the single beam.

In aspects, the single beam may include a flat, upper side on which the carriage is slidably supported.

In aspects, the seating assembly may further include a bottom plate fixed to a top side of the carriage, and a top plate fixed to a bottom side of the seat and rotatably supported on the bottom plate.

In aspects, the bottom plate may define a plurality of locking apertures positioned about a center point of the bottom plate. The seating assembly may further include a lever arm having a first end movably coupled to the seat, and a second end projecting outwardly from the seat and accessible to a user. The lever arm may have a projection extending downwardly therefrom and configured to selectively engage a locking aperture of the plurality of locking apertures to selectively fix a rotational position of the seat relative to the carriage.

In aspects, the seating assembly may further include a circular rotation plate and a plurality of roller bearings. The circular rotation plate and the plurality of roller bearings may be positioned between the top and bottom plates.

In aspects, the seating assembly may further include a plurality of roller bearings, and a plurality of friction pads positioned within the enclosed channel of the carriage and fixed to a first lateral side of the carriage and a second lateral side of the carriage. The roller bearings may be rotatably supported within the enclosed channel and in contact with the flat, upper side of the single beam and a top side of the carriage to facilitate sliding of the carriage relative to and along the single beam.

In aspects, the single beam may define a plurality of locking apertures along a length thereof. The seating assembly may further include a pin lock operably coupled to the carriage and having a first end configured to selectively engage a locking aperture of the plurality of locking apertures of the single beam to selectively resist sliding of the carriage relative to the single beam.

In aspects, the single beam and the carriage may each have a non-circular transverse cross-sectional shape.

In aspects, the non-circular transverse cross-sectional shape may be a triangle.

In aspects, the carriage may surround the single beam.

In aspects, the seat may be configured to detach from the carriage, the carriage may be configured to detach from the single beam, and the first and second side pedestals may be configured to detach from the single beam.

In accordance with another aspect of the present disclosure, a transfer bench for aiding a user in transitioning into and out of a bathing area is provided and includes a single beam including a first end and an opposite second end, a first side pedestal configured to be positioned outside of a bathing area, a second side pedestal configured to be positioned inside of the bathing area, and a seating assembly slidably supported on the single beam. The first side pedestal includes a first pair of legs having a vertical portion, and a horizontal portion secured within the first end of the single beam. The second side pedestal includes a second pair of legs having a vertical portion, and a horizontal portion secured within the second end of the single beam. The seating assembly includes a carriage surrounding the single beam and a seat rotatably supported on the carriage. The carriage defines a channel therethrough, and the carriage is configured to slide between the first and second ends of the single beam. The seat is configured to slide with the carriage along and relative to the single beam.

In aspects, the horizontal portion of the first pair of legs and the horizontal portion of the second pair of legs may be axially separated from one another along a longitudinal axis of the single beam.

In aspects, the seat may define a plurality of drainage holes therethrough positioned circumferentially about a center point of the seat. The seat may have an upper surface defining a plurality of horizontal channels that extend radially outward from the center point of the seat to the drainage holes to transport water from the center point of the seat to the plurality of drainage holes.

As used herein, the terms parallel and perpendicular are understood to include relative configurations that are substantially parallel and substantially perpendicular up to about + or −15 degrees from true parallel and true perpendicular.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

BRIEF DESCRIPTION OF THE DRAWINGS

Embodiments of the present disclosure are described herein with reference to the accompanying drawings, wherein.

DETAILED DESCRIPTION

Figure 1:
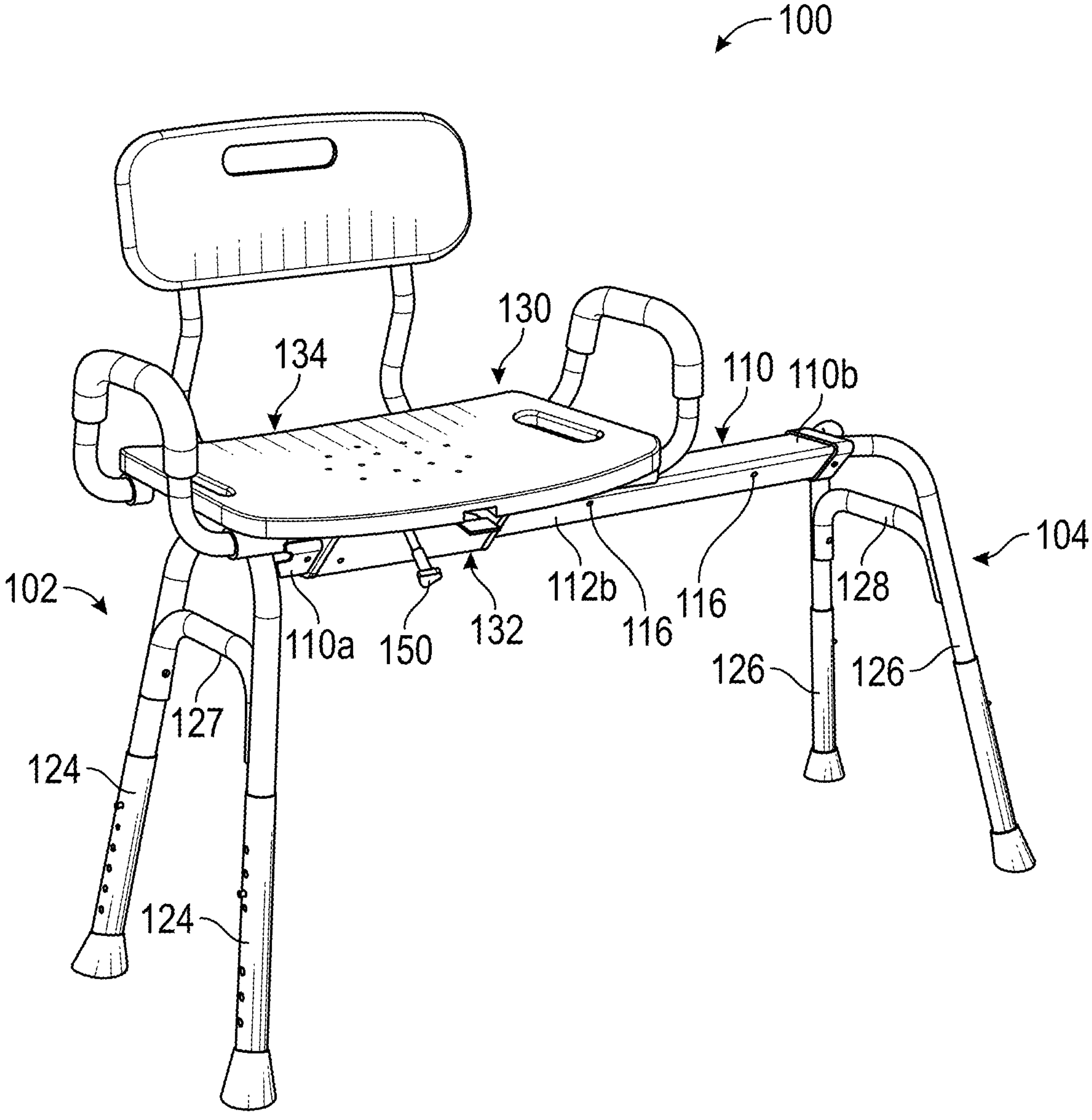
FIG. 1 is a front perspective view illustrating an exemplary embodiment of a transfer bench shown in an assembled state.

Embodiments of the presently disclosed transfer benches are described in detail with reference to the drawings, in which like reference numerals designate identical or corresponding elements in each of the several views.

With reference to FIGS. 1-4, an exemplary embodiment of a bath/shower transfer bench for aiding a user in getting in and out of a bathing area is illustrated and is generally designated 100. The transfer bench 100 generally includes a single beam 110, a first side pedestal 102 configured to be positioned outside of a bathing area "BA" (FIG. 3), a second side pedestal 104 configured to be positioned inside of the bathing area "BA", and a seating assembly 130 slidably supported on the single beam 110.

The single beam 110 is configured to slidingly support the seating assembly 130 thereon and includes a first end 110*a* and an opposite second end 110*b*. The single beam 110 couples the first and second side pedestals 102, 104 to one another and includes a flat, upper side 112*a* on which the seating assembly 130 is slidably supported, a first lateral side 112*b*, and a second lateral side (not explicitly shown) that collectively define an enclosed channel (not explicitly shown) through the single beam 110. The single beam 110 may have a non-circular transverse cross-sectional shape, such as, for example, a triangle, giving the single beam 110 a high tortional strength and vertical load strength and resists bending while also allowing for the seating assembly 130 to slide therealong. While a triangle provides the highest strength and facilitates sliding of the seating assembly 130, in some aspects the non-circular transverse cross-sectional shape may be a square, octagon, or other suitable shapes. The single beam 110 may be fabricated from a single triangular block of metal (e.g., aluminum or steel).

Figure 7:
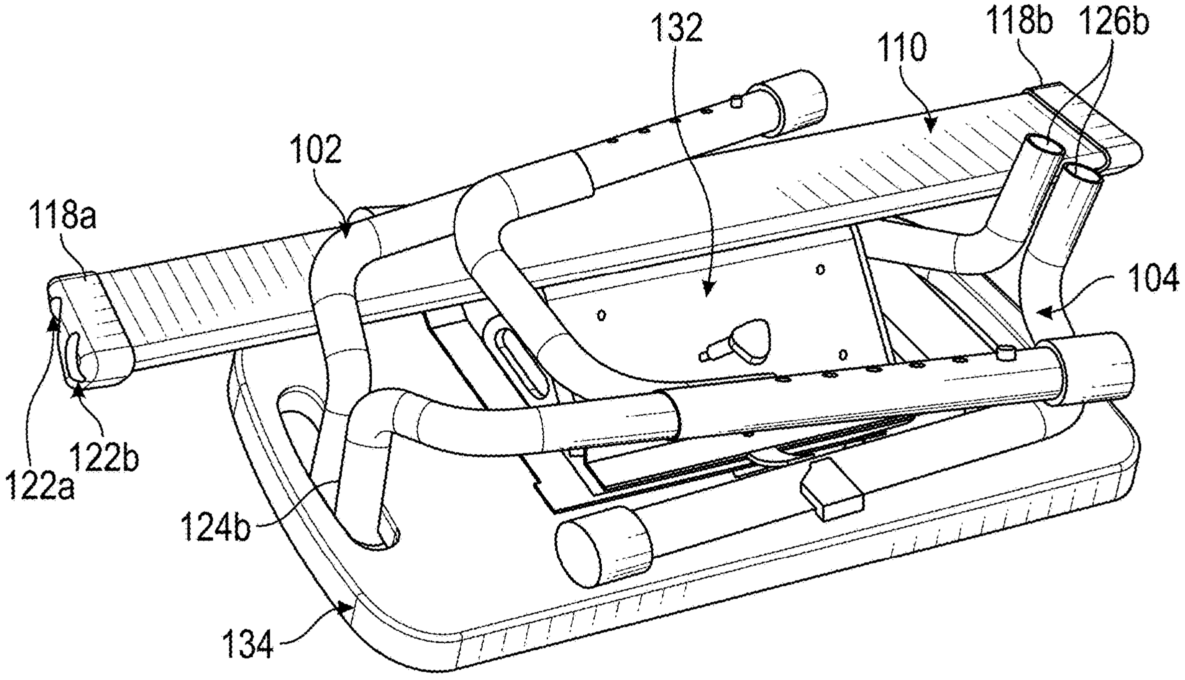
FIG. 7 is a perspective view illustrating the transfer bench of FIG. 1 in a disassembled state.
Figure 8:
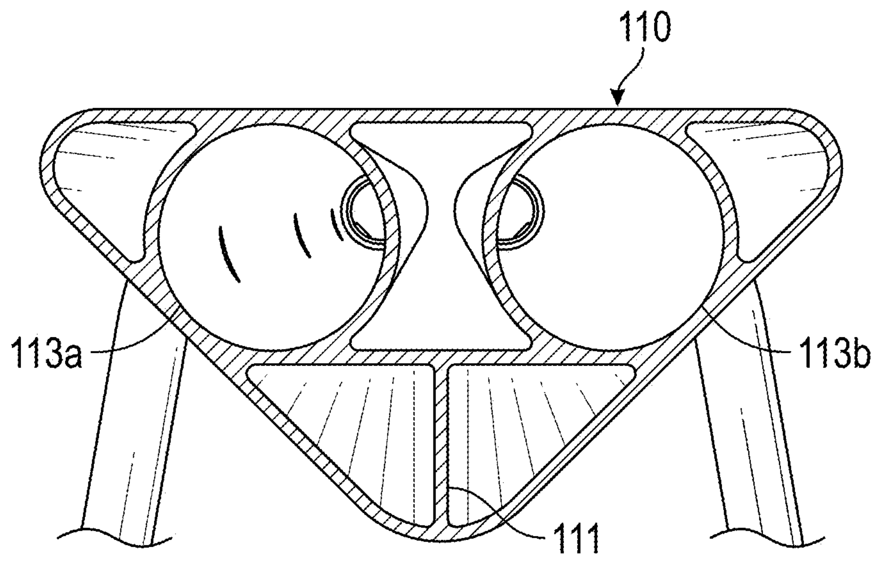
FIG. 8 is a transverse cross-section of an embodiment of a single beam of a transfer bench in accordance with aspects of the present disclosure.

In some aspects, with brief reference to FIG. 8, the single beam 110 may include a T-shaped support wall 111 positioned at the bottom vertex of the single beam 110 and extending along the length thereof. The T-shaped support wall 111 adds to the structural integrity of the single beam 110. In some aspects, the single beam 110 may include a pair of extruded metal tubes 113*a*, 113*b* that extend through the single beam 110 and are positioned adjacent the respective upper vertices of the single beam 110. The tubes 113*a*, 113*b* may extend through an entire length of the single beam 110 or may have a break in a middle thereof such that the tubes 113*a*, 113*b* are only positioned at the ends 110*a*, 110*b* of the single beam 110*a*, 110*b*. The tubes 113*a*, 133*b* function as connectors configured for frictional, releasable engagement with horizontal portions 124*b*, 126*b* (FIG. 7) of the first and second side pedestals 102, 104. The single beam 110 may be monolithically formed from a single piece of extruded metal.

With reference back to FIGS. 1-4, the single beam 110 may define a plurality of locking apertures 116 along a length thereof. For example, the plurality of locking apertures 116 may be defined in one of the first or second lateral sides 112*b* thereof and are spaced from one another along a longitudinal axis of the single beam 110. The locking apertures 116 are configured for the selective receipt of a locking assembly 150 of the seating assembly 130 to selectively fix the seating assembly 130 in an axial position along the length of the single beam 110, as will be described in further detail herein.

The single beam 110 may include first and second end caps 118*a*, 118*b* fixed within respective openings in the first and second ends 110*a*, 110*b* of the single beam 110. The end caps 118*a*, 118*b* function as stops or limits for the seating assembly 130 to prevent the seating assembly 130 from sliding off the single beam 110. The end caps 118*a*, 118*b* may define a pair of horizontally-extending channels 122*a*, 122*b* (FIG. 4) therethrough configured for friction-fit engagement with the first and second side pedestals 102, 104. In another aspect, instead of or in addition to having end caps 118*a*, 118*b*, the first and second ends 110*a*, 110*b* of the single beam 110 may have the channels 122*a*, 122*b* directly formed therein.

With continued reference to FIGS. 1-4, the first side pedestal 102 is configured to detachably couple to the first end 110*a* of the single beam 110 and may include a first pair of legs 124 coupled to one another with a cross bar 127. In aspects, the first pair of legs 124 may be monolithically formed with one another. Each of the first pair of legs 124 may have a vertical portion or leg 124*a*, and a horizontal portion or arm 124*b* extending perpendicularly from the vertical leg 124. In aspects, the vertical legs 124*a* may each have two telescoping tubes to allow for vertical height adjustment of the first side pedestal 102. The horizontal portions 124*b* of the first pair of legs 124 are configured for friction-fit engagement with the respective channels 122*a*, 122*b* in the first end cap 118*a* of the single beam 110.

Similarly, the second side pedestal 104 is configured to detachably couple to the second end 110*b* of the single beam 110 and includes a second pair of legs 126. The second pair of legs 126 are coupled to one another with a cross bar 128. In aspects, the second pair of legs 126 may be monolithically formed with one another. Each of the second pair of legs 126 may have a vertical portion or leg 126*a*, and a horizontal portion or arm 126*b* extending perpendicularly from the vertical leg 126*a*. In aspects, the vertical legs 126*a* of the second side pedestal 104 may each have two telescoping tubes to allow for vertical height adjustment of the second side pedestal 104. The horizontal portions 126*b* of the second pair of legs 126 are configured for friction-fit engagement with the respective channels 122*a*, 122*b* in the second end cap 118*b* of the single beam 110.

The horizontal portions 124*b* of the first side pedestal 102 are configured to extend partially into the first end 110*a* of the single beam 110, and the horizontal portions 126*b* of the second side pedestal 104 are configured to extend partially into the second end 110*b* of the single beam 110 such that the horizontal portions 124*b* of the first pair of legs 124 and the horizontal portions 126*b* of the second pair of legs 126 are axially separated (e.g., disconnected) from one another along the longitudinal axis of the single beam 110. In this way, the horizontal portions 124*b*, 126*b* of the first and second side pedestals 102, 104 do not interconnect with one another within the single beam 110 thereby allowing the first and second side pedestals 102, 104 to be disassembled from the single beam 110 without compromising the structural integrity of the transfer bench 100.

Figure 4:
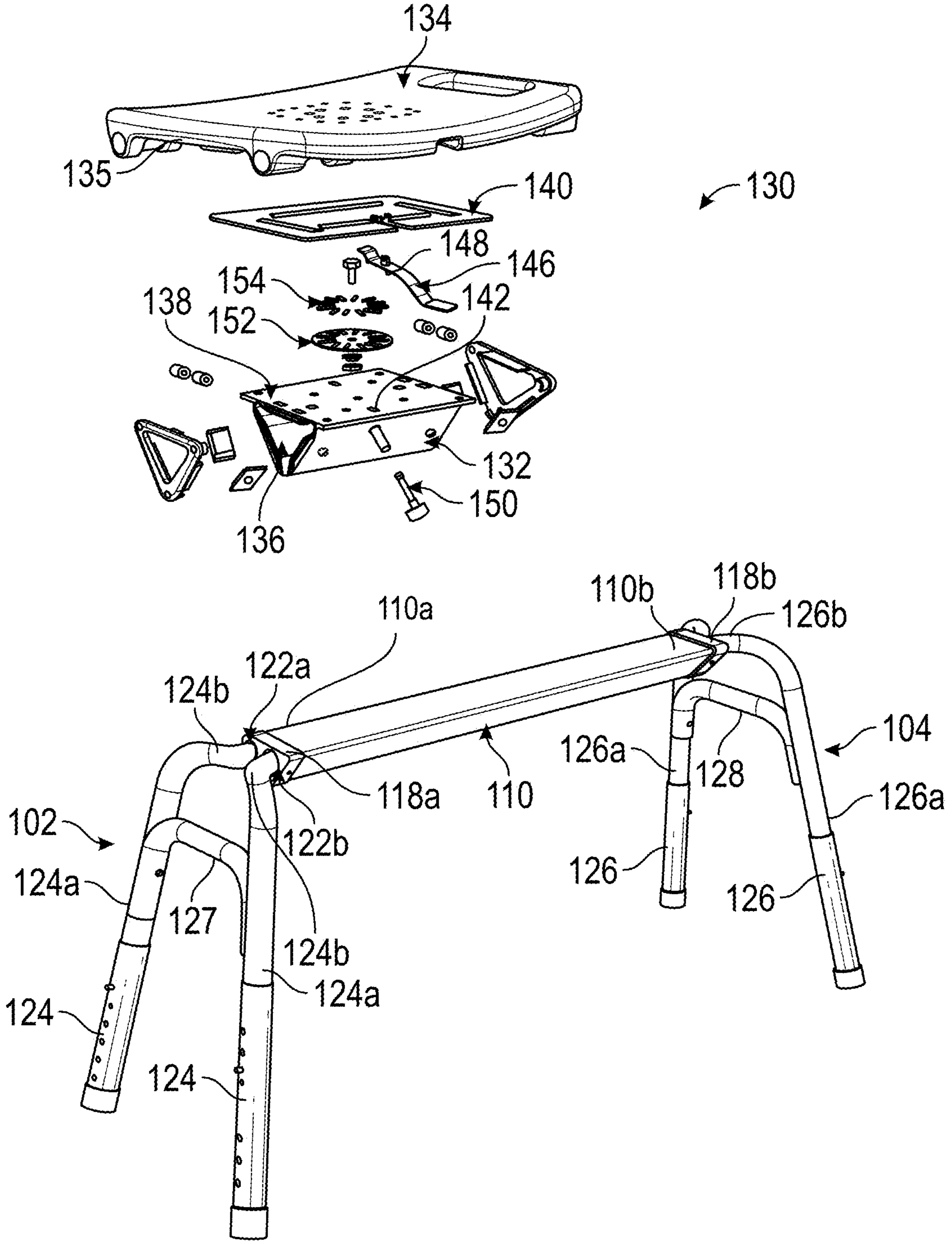
FIG. 4 is a front perspective view of the transfer bench of FIG. 1 showing parts of a seating assembly separated.
Figure 5:
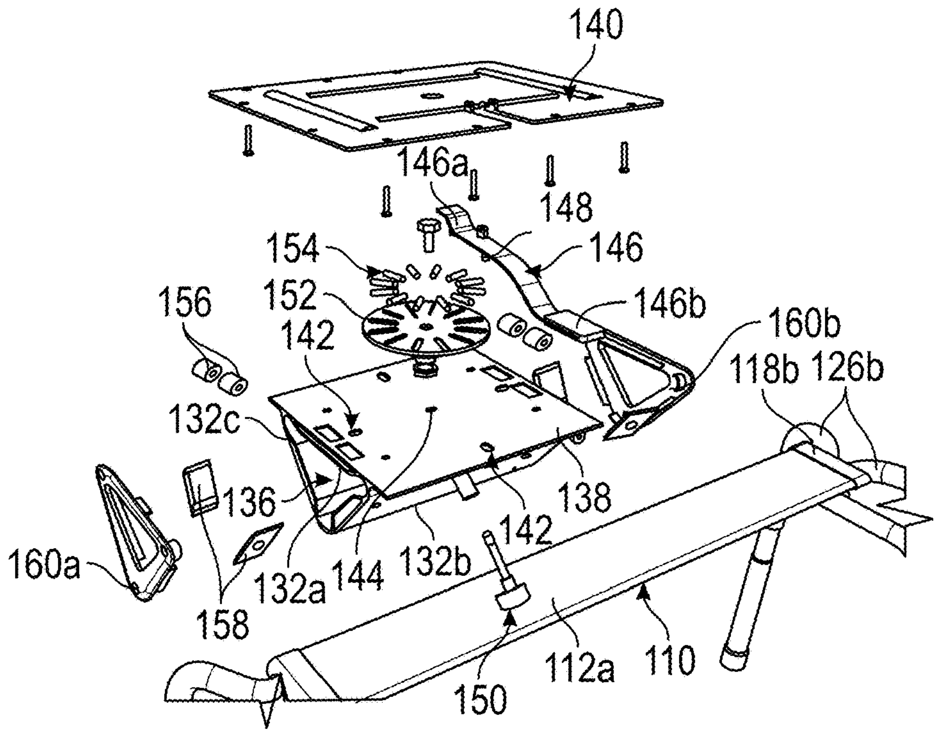
FIG. 5 is an enlarged front perspective view of the parts of the seating assembly of FIG. 4.
Figure 6:
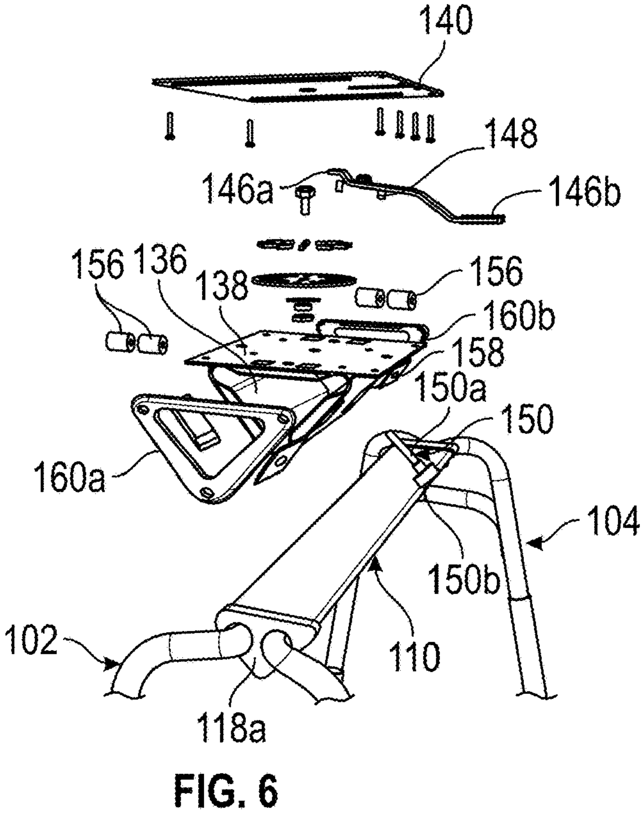
FIG. 6 is an enlarged side perspective view of the parts of the seating assembly of FIG. 4.

With reference to FIGS. 4-6, the seating assembly 130 of the transfer bench 100 includes a carriage 132 and a seat 134 rotatably supported on the carriage 130. The seat 134 is configured to slide with the carriage 132 along and relative to the single beam 110. The carriage 132 has a top, flat side 132*a*, a flat, first lateral side 132*b*, and a flat, second lateral side 132*c* that collectively define a triangular shaped enclosed channel 136 through the carriage 132. The single beam 110 extends through the enclosed channel 136 of the carriage 132. The carriage 132 may have the same non-circular (e.g., triangular) transverse cross-sectional shape as the single beam 110. Due to the non-circular transverse cross-sectional, complimentary shapes of the carriage 132 and the single beam 110, the carriage 132 is prevented from rotating about the longitudinal axis of the single beam 110 while permitting a smooth translation of the seating assembly 130 along the single beam 110.

The seating assembly 130 includes a bottom plate 138 fixed to the top side 132*a* of the carriage 132, and a top plate 140 fixed to a bottom side 135 of the seat 134 and rotatably supported on the bottom plate 138. The bottom plate 138 may be monolithically formed with the top side 132*a* of the carriage 132 and may define a plurality of locking apertures 142 positioned about a center point 144 of the bottom plate 138. The seating assembly 130 may further include a lever arm 146 having a first end 146*a* movably coupled to the seat 134, and a second end 146*b* projecting outwardly from the seat 134 and accessible to a user. The lever arm 146 may be pivotably coupled to the bottom side 135 of the seat 134 at the first end 146*a* of the lever arm 146. The lever arm 146 may have a projection 148, such as, for example, a pin, extending downwardly therefrom and configured to selectively engage one of the locking apertures 142 in the bottom plate 138 to selectively fix a rotational position of the seat 134 relative to the carriage 132. The pin 148 may be tapered along its length.

A biasing member (e.g., a torsion spring or a leaf spring) may be provided vertically between the first end 146*a* of the lever arm 146 and the bottom plate 138 to resiliently bias the projection 148 of the lever arm 146 into engagement with the bottom plate 138. As such, before rotating the seat 134, a user is required to first actuate the lever arm 146 by lifting up the second end 146*b* of the lever arm 146 to disengage the projection 148 thereof from one of the locking apertures 142 of the bottom plate 138.

The seating assembly may further include a circular rotation plate 152 and a plurality of roller bearings 154 positioned between the bottom and top plates 138, 140. The circular rotation plate 152 and the roller bearings 154 facilitate rotation of the bottom plate 138 relative to the top plate 140.

The carriage 132 may further include a plurality of carriage roller bearings 156, and a plurality of friction pads 158 partially positioned within the enclosed channel 136 of the carriage 132. The carriage roller bearings 156 may be rotatably supported within the enclosed channel 136 and in contact with an upper surface of the flat, upper side 112*a* of the single beam 110 and an undersurface of the top side 132*a* of the carriage 132 to facilitate sliding of the carriage 132 relative to and along the single beam 110. In other aspects, the roller bearings 156 (e.g., pins) may be rotatably supported by the first and second lateral sides 132*b*, 132*c* of the carriage 132 instead of or in addition to the top side 132*a* of the carriage 132. The carriage roller bearings 156 may protrude downwardly through respective slots defined in the bottom 138 of the carriage 132 and into the enclosed channel 136 of the carriage 132. The friction pads 158 may include a first pair of friction pads fixed to an inner-facing surface of the first lateral side 132*b* of the carriage 132, and a second pair of friction pads fixed to an inner-facing surface of the second lateral side 132*c* of the carriage 132 which together function to limit a speed at which the seating assembly 130 slides along the single beam 110. In aspects, the friction pads 158 may be partially or entirely positioned within the enclosed channel 136 of the carriage 132.

The seat 134 may define a plurality of drainage holes therethrough to prevent the pooling of water on the seat 134. In aspects, the drainage holes may be positioned outside of an outer periphery of the various components of the seating assembly 130, such as, for example, the top and bottom plates 138, 140, the circular rotation plate 152, and the roller bearings 154. As such, water that drains through the drainage holes of the seat 134 does not contact metal components of the seating assembly 130.

The locking assembly 150 of the seating assembly 130 may be a pin lock operably coupled to the carriage 132, such as, for example, the first lateral side 132*a* of the carriage 132. The pin lock 150 has a first end 150*a* configured to selectively engage one of the locking apertures 142 of the single beam 110 to selectively resist sliding of the carriage 132 relative to the single beam 110. The pin lock 150 has a second end 150*b* configured to be grasped by a user to pull the first end 150*a* of the pin lock 150 out of engagement with the single beam 110 to unlock the carriage 132 from the single beam 110. The pin lock 150 may be resiliently biased toward a state in which the first end 150*a* of the pin lock 150 is engaged with the single beam 110.

The carriage 132 may include first and second end caps 160*a*, 160*b* that fill openings defined in opposing first and second longitudinal ends of the carriage 132. The end caps

160*a*, 160*b* of the carriage 132 are configured to engage the end caps 118*a*, 118*b* of the single beam 110 when the seating assembly 130 reaches one of the first or second ends 110*a*, 110*b* of the single beam 110 to prevent the seating assembly 110 from sliding off the single beam 110 during use.

Figure 2:
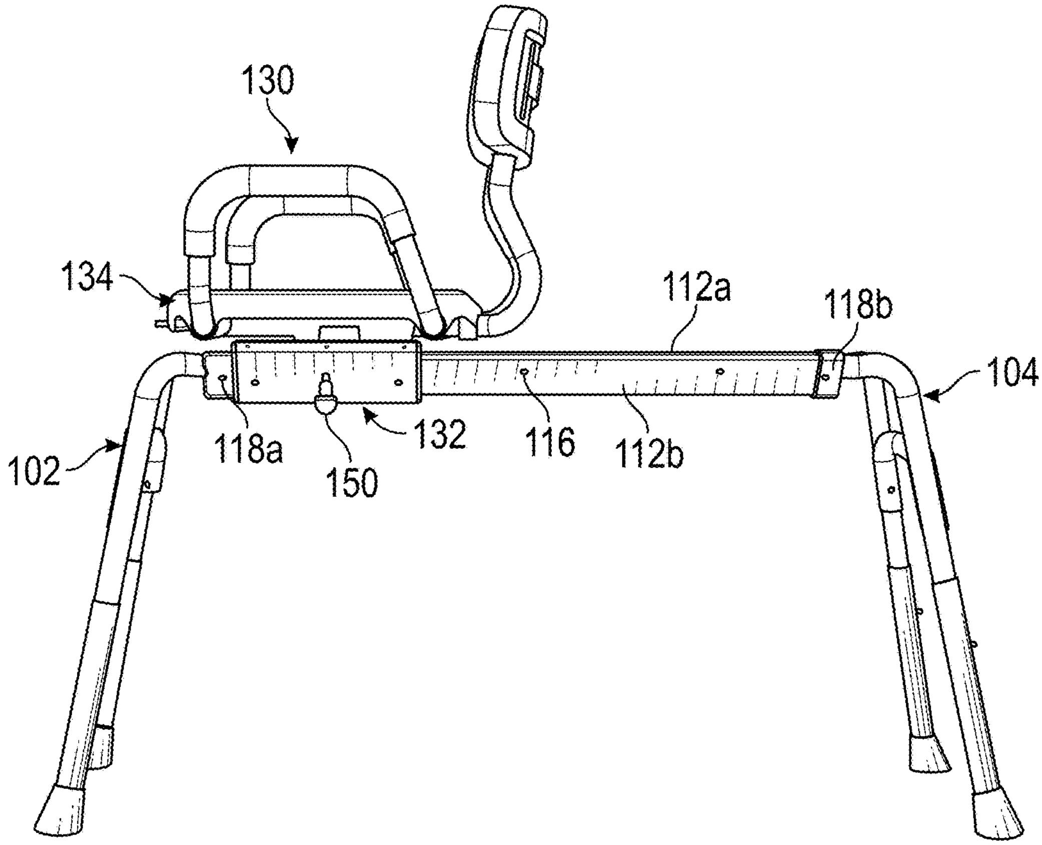
FIG. 2 is a front view of the transfer bench of FIG. 1 with a seat thereof in a side-facing orientation.
Figure 3:
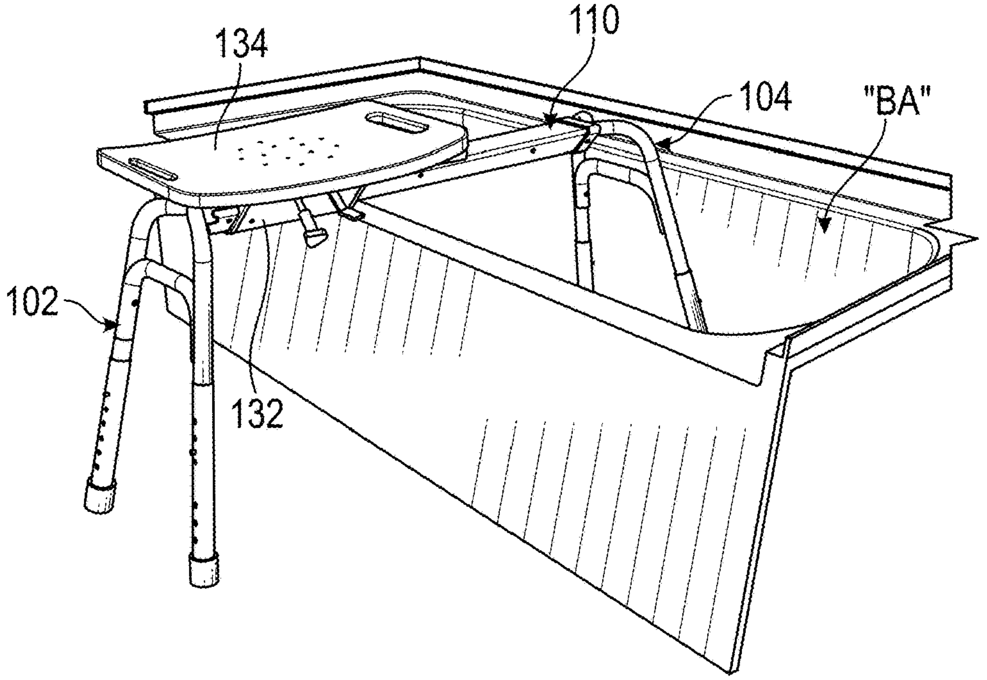
FIG. 3 is a front perspective view of the transfer bench of FIG. 1, with backrest handlebars removed, showing the transfer bench traversing a side wall of a bathtub.

In use, the transfer bench 100 is positioned with the first side pedestal 102 inside the bathing area "BA" (FIG. 3) and the second side pedestal 104 outside the bathing area "BA". The seat 134 may be unlocked from the carriage 132 by lifting the lever arm 146 thereby disengaging the projection 148 of the lever arm 146 from one of the locking apertures 142 of the bottom plate 138. While holding the lever arm 146 in an upward or unlocked configuration, the seat 134 may be rotated into a position in which a longitudinal axis of the seat 134 is perpendicular to the longitudinal axis of the single beam 110, as shown in FIG. 2. With the seat 134 in this position, a user or assistant may release the lever arm 146 to allow the projection 148 of the lever arm 146 to engage one of the locking apertures 142 to prevent rotation of the seat 134 out of the selected orientation. With the seat 134 locked in the lateral-facing direction, a user may more easily be seated on the seat 134 from a position outside of the bathing area "BA". With the user safely seated, the lever arm 146 may again be actuated and the seat 134, with the user thereon, may be rotated relative to the carriage 132 about a central axis extending through a plane of the seat 134 to orient the seat 134 and user in a front-facing position (FIGS. 1 and 3).

The pin lock 150 of the carriage 132 may be pulled out of engagement with one of the locking apertures 116 of the single beam 110 to allow for sliding of the seating assembly 130. With the carriage 132 unlocked from the single beam 110, the seating assembly 130 and user may be translated along the longitudinal axis of the single beam 110 to move the user into the bathing area "BA". With the user in a desired location along the single beam 110, the pin lock 150 may be released to allow the pin lock 150 to lockingly engage with one of the apertures 116 of the single beam 110 thereby preventing further translation of the seating assembly 130.

As shown in FIG. 7, the transfer bench 100 may be disassembled to reduce its footprint for storage or transport. To disassemble the transfer bench 100, the horizontal portions 124*b* of the first side pedestal 102 may be forcibly removed from the first end 110*a* of the single beam 110 and the horizontal portions 126*b* of the second side pedestal 104 may be forcibly removed from the second end 110*b* of the single beam 110 by overcoming the frictional engagement of the horizontal portions 124*b*, 126*b* of the respective first and second side pedestals 102, 104 with the respective end caps 118*a*, 118*b* of the single beam 110 and/or the ends of the internal metal tubes 113*a*, 113*b* (FIG. 8) of the single beam 110. To remove the seating assembly 130 from the single beam 110, one of the end caps 160*a*, 160*b* of the carriage 132 may be detached therefrom to allow for the carriage 132 to be slid off an end 110*a* or 110*b* of the single beam 110.

Figure 9:
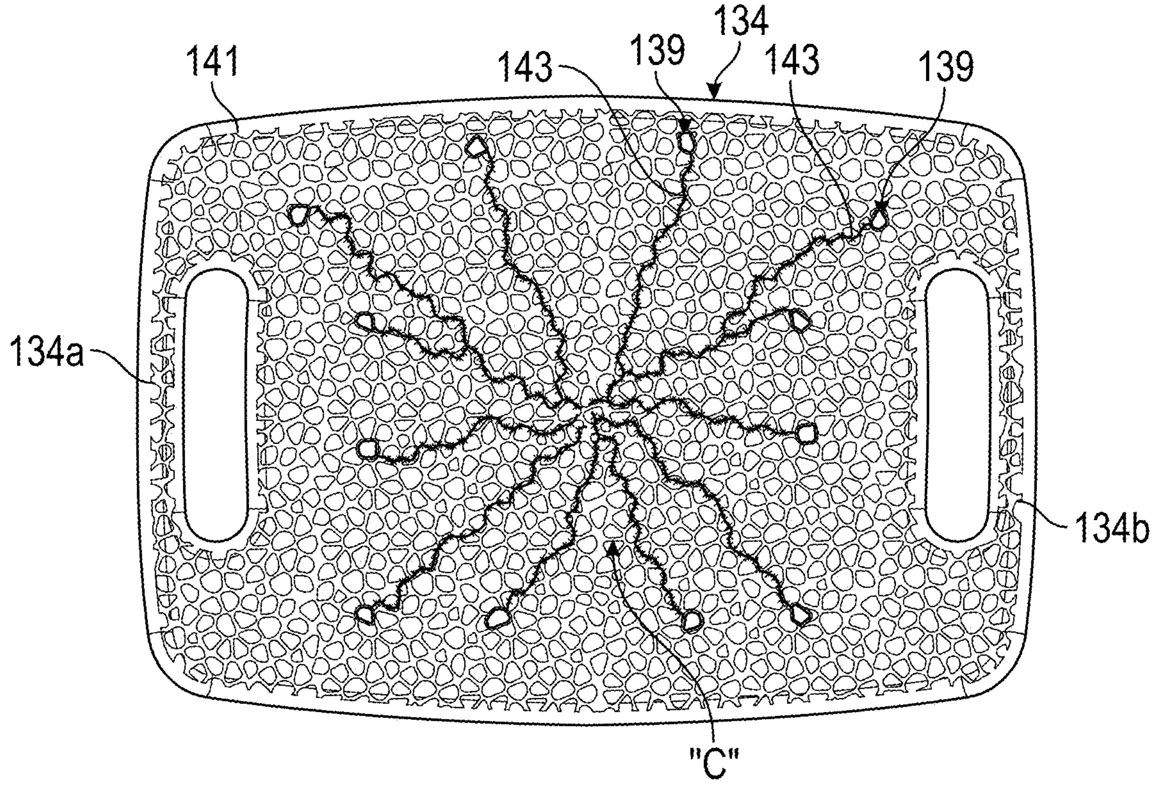
FIG. 9 is a top view of an embodiment of a seat of a transfer bench in accordance with aspects of the present disclosure.

With reference to FIG. 9, to aid in comfort for the user, the seat 134 may be concave between opposite first and second ends 134*a*, 134*b* thereof. The seat 134 may define a plurality of drainage holes 139 that extend through a thickness of the seat 134 to prevent pooling of water within a central region "C" or seating area of the seat 134. The drainage holes 139 are positioned outside of the central region "C" of the seat 134. The central region "C" may be defined by an outer boundary of the internal components of the seating assembly 132, e.g., the bottom and top plates 138, 140, the circular rotation plate 152, the roller bearings 154, and the carriage 132. Due to the drainage holes 139 being positioned outside of the central region "C", water that drains through the drainage holes 139 of the seat 134 does not contact metal components of the seating assembly 130.

The seat 134 has an upper surface 141 defining a plurality of horizontal channels 143 extending radially outward from a center point of the seat 134 to the drainage holes 139 to facilitate the transfer of water from the central region "C" to the plurality of drainage holes 139. The horizontal channels 143 may extend parallel with the single beam 110 or may be sloped downward from the center point of the central region "C" to the drainage holes 139. The horizontal channels 143 may be recessed from the upper surface 141 of the seat 134 and provide fluid communication between the center point of the seat 134 and the drainage holes 139. In this embodiment, no drainage holes are present within the central region "C".

It will be understood that various modifications may be made to the embodiments disclosed herein. Therefore, the above description should not be construed as limiting, but merely as exemplifications of various embodiments. Those skilled in the art will envision other modifications within the scope of the claims appended thereto.

What is claimed is:

1. A transfer bench for aiding a user in transitioning into and out of a bathing area, the transfer bench comprising:

a first side pedestal configured to be positioned outside of a bathing area, the first side pedestal including a first pair of legs coupled to one another;

a second side pedestal configured to be positioned inside of the bathing area, the second side pedestal including a second pair of legs coupled to one another;

a single beam coupling the first and second side pedestals to one another, the single beam including a first end and an opposite second end, the first side pedestal being coupled to the first end of the single beam, and the second side pedestal being coupled to the second end of the single beam, each of the first pair of legs of the first side pedestal having a vertical portion, and a horizontal portion configured to extend into the first end of the single beam, each of the second pair of legs of the second side pedestal having a vertical portion, and a horizontal portion configured to extend into the second end of the single beam; and a seating assembly slidably supported on the single beam and including:

a carriage defining an enclosed channel therethrough, the single beam extending through the enclosed channel of the carriage and configured to slidingly support the carriage thereon; and a seat supported on the carriage and configured to slide with the carriage along and relative to the single beam.

2. The transfer bench according to claim 1, wherein the carriage is configured to slide relative to and along the single beam between the first and second ends thereof.

3. The transfer bench according to claim 1, wherein the horizontal portion of the first pair of legs and the horizontal portion of the second pair of legs are separated from one another along a longitudinal axis of the single beam.

4. The transfer bench according to claim 1, wherein the single beam includes a flat, upper side on which the carriage is slidably supported.

5. The transfer bench according to claim 4, wherein the seating assembly further includes:

a bottom plate fixed to a top side of the carriage; and a top plate fixed to a bottom side of the seat and rotatably supported on the bottom plate.

6. The transfer bench according to claim 5, wherein the bottom plate defines a plurality of locking apertures positioned about a center point of the bottom plate, the seating assembly further including a lever arm having a first end movably coupled to the seat, and a second end projecting outwardly from the seat and accessible to a user, the lever arm having a projection extending downwardly therefrom and configured to selectively engage a locking aperture of the plurality of locking apertures to selectively fix a rotational position of the seat relative to the carriage.

7. The transfer bench according to claim 5, wherein the seating assembly further includes a circular rotation plate and a plurality of roller bearings, the circular rotation plate and the plurality of roller bearings being positioned between the top and bottom plates.

8. The transfer bench according to claim 4, wherein the seating assembly further includes:

a plurality of roller bearings rotatably supported within the enclosed channel and in contact with the flat, upper side of the single beam and a top side of the carriage to facilitate sliding of the carriage relative to and along the single beam; and a plurality of friction pads positioned within the enclosed channel of the carriage and fixed to a first lateral side of the carriage and a second lateral side of the carriage.

9. The transfer bench according to claim 1, wherein the single beam defines a plurality of locking apertures along a length thereof, the seating assembly further including a pin lock operably coupled to the carriage and having a first end configured to selectively engage a locking aperture of the plurality of locking apertures of the single beam to selectively resist sliding of the carriage relative to the single beam.

10. The transfer bench according to claim 1, wherein the single beam and the carriage each have a non-circular transverse cross-sectional shape.

11. The transfer bench according to claim 10, wherein the non-circular transverse cross-sectional shape is a triangle.

12. The transfer bench according to claim 1, wherein the carriage surrounds the single beam.

13. The transfer bench according to claim 1, wherein the seat is configured to detach from the carriage, the carriage is configured to detach from the single beam, and the first and second side pedestals are configured to detach from the single beam.

14. A transfer bench for aiding a user in transitioning into and out of a bathing area, the transfer bench comprising:

a single beam including a first end and an opposite second end;

a first side pedestal configured to be positioned outside of a bathing area and including a first pair of legs having a vertical portion, and a horizontal portion secured within the first end of the single beam;

a second side pedestal configured to be positioned inside of the bathing area and including a second pair of legs having a vertical portion, and a horizontal portion secured within the second end of the single beam; and a seating assembly slidably supported on the single beam and including:

a carriage defining a channel therethrough, the carriage surrounding the single beam such that the single beam extends through the channel, the carriage being configured to slide between the first and second ends of the single beam; and a seat rotatably supported on the carriage and configured to slide with the carriage along and relative to the single beam.

15. The transfer bench according to claim 14, wherein the horizontal portion of the first pair of legs and the horizontal portion of the second pair of legs are axially separated from one another along a longitudinal axis of the single beam.

16. The transfer bench according to claim 14, wherein the single beam includes a flat, upper side on which the carriage is slidably supported.

17. The transfer bench according to claim 14, wherein the seating assembly further includes:

a bottom plate fixed to a top side of the carriage; and a top plate fixed to a bottom side of the seat and rotatably supported on the bottom plate.

18. The transfer bench according to claim 14, wherein the seat defines a plurality of drainage holes therethrough positioned circumferentially about a center point of the seat, the seat having an upper surface defining a plurality of horizontal channels that extend radially outward from the center point of the seat to the drainage holes to transport water from the center point of the seat to the plurality of drainage holes.

19. A transfer bench for aiding a user in transitioning into and out of a bathing area, the transfer bench comprising:

a first side pedestal configured to be positioned outside of a bathing area, the first side pedestal including a pair of legs;

a second side pedestal configured to be positioned inside of the bathing area, the second side pedestal including a pair of legs;

a single beam coupling the first and second side pedestals to one another, wherein the single beam includes a pair of metal tubes extending at least partially through the single beam, the pair of legs of the first side pedestal having upper ends configured for receipt in respective first ends of the pair of metal tubes, the pair of legs of the second side pedestal having upper ends configured for receipt in respective second ends of the pair of metal tubes; and a seating assembly slidably supported on the single beam and including:

a carriage defining an enclosed channel therethrough, the single beam extending through the enclosed channel of the carriage and configured to slidingly support the carriage thereon; and a seat supported on the carriage and configured to slide with the carriage along and relative to the single beam.

20. The transfer bench according to claim 19, wherein the pair of metal tubes are fixed within the single beam and extend through an entire length of the single beam.

* * * * *